(12) United States Patent
Zhou et al.

(10) Patent No.: US 11,246,201 B1
(45) Date of Patent: Feb. 8, 2022

(54) LED DRIVER WITH CONTROLLED LUMINOUS DRAWDOWN CAPABILITY

(71) Applicant: Cuvee Systems, Inc., San Jose, CA (US)

(72) Inventors: Dongsheng Zhou, Cupertino, CA (US); Lanh Cong Nguyen, Santa Clara, CA (US)

(73) Assignee: Cuvee Systems, Inc., San Jose, CA (US)

( * ) Notice: Subject to any disclaimer, the term of this patent is extended or adjusted under 35 U.S.C. 154(b) by 0 days.

(21) Appl. No.: 17/090,647

(22) Filed: Nov. 5, 2020

(51) Int. Cl.
*H05B 45/30* (2020.01)
*H05B 45/345* (2020.01)
*H05B 45/355* (2020.01)
*H05B 45/38* (2020.01)
*H05B 45/375* (2020.01)

(52) U.S. Cl.
CPC ......... *H05B 45/345* (2020.01); *H05B 45/355* (2020.01); *H05B 45/375* (2020.01); *H05B 45/38* (2020.01)

(58) Field of Classification Search
CPC ........ H05B 45/10; H05B 45/37; H05B 45/39; H05B 45/40; H05B 45/355; H05B 45/382; H05B 45/3725
See application file for complete search history.

(56) References Cited

U.S. PATENT DOCUMENTS

| | | | | |
|---|---|---|---|---|
| 2014/0091718 | A1* | 4/2014 | Brinlee | H05B 45/39 315/185 R |
| 2015/0130372 | A1* | 5/2015 | Chitta | H05B 45/345 315/307 |
| 2015/0195878 | A1* | 7/2015 | Garrity | H05B 45/37 315/186 |
| 2019/0182922 | A1* | 6/2019 | Jain | H02M 1/4208 |
| 2021/0204376 | A1* | 7/2021 | Muehlschlegel | H03K 5/01 |

\* cited by examiner

*Primary Examiner* — Tung X Le
(74) *Attorney, Agent, or Firm* — Spano Law Group; Joseph S. Spano

(57) ABSTRACT

Methods and systems for controlling current provided to one or more LEDs for a period of time after power supplied to the LED driver is shut down are described herein. By controlling current through the one or more LEDs after shutdown, the light emitted from the one or more LEDs transitions to zero at a predictable rate with a predictable lag time. An LED based illumination system includes an energy storage element and a controlled luminous drawdown module electrically coupled between one or more LEDs and an electrical power converter employed to control current provided to the one or more LEDs during normal operation. The controlled luminous drawdown module senses a reduction in voltage at the output of the electrical power converter and operates to control current flow through one or more LEDs of the LED string until electrical energy stored in the electrical storage element is depleted.

25 Claims, 5 Drawing Sheets

US 11,246,201 B1

LED DRIVER WITH CONTROLLED LUMINOUS DRAWDOWN CAPABILITY

TECHNICAL FIELD

The described embodiments relate to electrical power conversion and control, and more specifically, to electrical power conversion and control for solid state lighting devices.

BACKGROUND INFORMATION

Light emitting diode (LED) based illumination devices have emerged as a preferred technology for general illumination. The high efficiency of LEDs reduces electrical power consumption, making LEDs an environmentally attractive lighting solution. In many examples, municipalities at the city, state, and national level have enacted regulations requiring a transition from the use of incandescent light bulbs to LED based lighting devices.

Traditionally, the light emitted from incandescent bulbs ceases almost immediately after shutdown of the electrical power supply. As the voltage supplied across the resistive filament drops, the current flow through the resistive filament drops in proportion to the voltage with practically no lag time. When the voltage supplied to the resistive element is suddenly dropped to zero, e.g., the power switch to the incandescent bulb is turned off, the current flow through the resistive element, and thus the light emitted from the incandescent also suddenly drops to zero.

LEDs are by nature a diode, rather than a resistor. The light emitted from a conventional LED depends on the current supplied to the LED or string of LEDs at a fixed voltage, i.e., the forward voltage of the LED or string of LEDs. In many practical applications, a power converter is employed to control the light output from an LED based illumination device. The power converter controls the current supplied to the LEDs and converts electrical power supply voltage to a forward voltage of the LED or string of LEDs.

As current supplied to the LED drops, the light emitted from the LED drops in proportion to the current with practically no lag time. However, in many cases, when the voltage supplied to the power converter is suddenly brought to zero, e.g., the power switch to the power converter is turned off, the current flow through the LED, and thus the light emitted from the LED does not drop instantaneously. Often, light emitted from the LED drops to zero at an unpredictable rate with an unpredictable lag time. In some examples, users of LED illumination devices are discomforted by the lack of predictability in shutdown of the LED illumination.

In summary, it is desirable to improve LED utilization and adoption by managing the illumination from LEDS after power supply shutdown to provide a more predictable and user friendly experience.

SUMMARY

Methods and systems for controlling current provided to one or more LEDs for a period of time after power supplied to the LED driver is shut down are described herein. By controlling current through the one or more LEDs after shutdown, the light emitted from the one or more LEDs transitions to zero at a predictable rate with a predictable lag time.

In one aspect, an LED based illumination system includes an energy storage element and a controlled luminous drawdown module electrically coupled between one or more LEDs and an electrical power converter employed to control current provided to the one or more LEDs during normal operation. The controlled luminous drawdown module senses a reduction in voltage at the output of the electrical power converter and operates to control current flow through one or more LEDs of the LED string until electrical energy stored in the electrical storage element is depleted.

In some embodiments, a controlled luminous drawdown module includes a buck converter employed to control current flow through one or more LEDs of an LED string after sensing a reduction in voltage at the output of an electrical power converter that provides current to the LED string during normal operation.

In other embodiments, a controlled luminous drawdown module includes a boost converter employed to control current flow through one or more LEDs of an LED string after sensing a reduction in voltage at the output of an electrical power converter that provides current to the LED string during normal operation.

In some embodiments, a controlled luminous drawdown module includes a linear converter employed to control current flow through one or more LEDs of an LED string after sensing a reduction in voltage at the output of an electrical power converter that provides current to the LED string during normal operation.

In some embodiments, the controlled luminous drawdown module is integrated with an LED driver and an LED string as a fully integrated LED based illumination device.

In some other embodiments, the controlled luminous drawdown module is integrated with and LED driver, but not with the corresponding LED string.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for controlling current provided to one or more LEDs for a period of time after power supplied to the LED driver is shut down are described herein. By controlling current through the one or more LEDs after shutdown, the light emitted from the one or more LEDs transitions to zero at a predictable rate with a predictable lag time. More specifically, the methods and systems described herein control the flow of electrical power from an energy storage element to the one or more LEDs until energy stored in the energy storage element is depleted. The energy storage element is coupled between the LED driver and the one or more LEDs.

Figure 1:
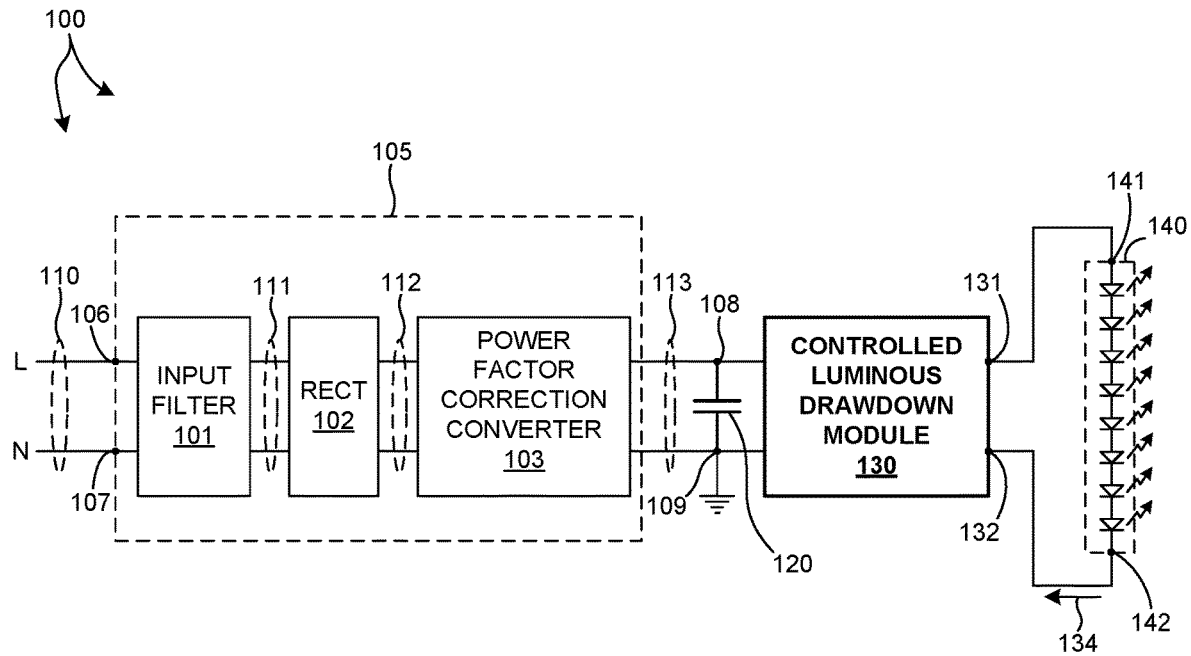
FIG. 1 depicts an illustration of an LED based illumination system 100 in one embodiment.

FIG. 1 depicts an illustration of an LED based illumination system 100 in one embodiment. LED based illumination system 100 includes electrical power driver 105, energy storage element 103, controlled luminous drawdown module 130, and LED string 140 including a number of LEDs electrically coupled in series.

In the embodiment depicted in FIG. 1, electrical power driver 105 is a single stage current controlled Alternating Current/Direct Current (AC/DC) converter that generates a controlled current 113 to power LED string 140. AC input power 110 is received across input nodes 106 and 107 of AC/DC converter 105. In some embodiments, AC input power 110 is provided at a voltage having any possible value in a range from 80 VAC to 300 VAC. Although electrical power driver 105 is depicted as an AC/DC converter, in general, electrical power driver 105 may be any suitable power converter, such as a Direct Current/Direct Current (DC/DC) converter.

As depicted in FIG. 1, AC input power 110 is provided to input filter 101. Input filter 101 protects the source of AC input power from unwanted electromagnetic interference by effectively blocking unwanted power spikes that may be generated by the AC/DC converter 105. Filtered AC input power 111 is transmitted to rectifier 102. In one embodiment, rectifier 102 is a diode bridge that rectifies the filtered AC voltage into a one directional half sine wave voltage signal 112. Power factor correction converter 103 is a switched mode isolated flyback converter that includes a primary side that generates a sine wave input current in phase with the rectified voltage signal 112. This helps to achieve a high power factor (PF) and effective power factor correction (PFC). Power factor correction converter 103 also includes a secondary side that generates a controlled output current 113 supplied to LED string 140.

Energy storage element 120 is coupled across the output nodes 108 and 109 of electrical power driver 105. In the embodiment depicted in FIG. 1, energy storage element 120 is a bulk capacitor. However, in general, energy storage element 120 includes any suitable energy storage device such as a rechargeable battery, an electrolytic capacitor, a supercapacitor, etc. In general, energy storage element 120 is capable of storing a substantial amount of electrical energy. In some embodiments, electrical storage element 120 is a capacitor having a capacitance greater than 100 microfarads. As illustrated in FIG. 1, bulk capacitor 120 filters out high frequency current components induced by switching elements of power factor correction converter 103 from the current 113 supplied to LED string 140.

During normal operation, power factor correction converter 103 controls the average lumen output of light emitted from LED string 140 by controlling the value of current 113 available to flow through LED string 140. In some embodiments, PFCC 103 receives a brightness control signal from a controller. The brightness control signal indicates a desired current flow 113 available to LED string 140. In turn, power factor correction converter 103 adjusts its output current to achieve the desired current flow, and consequently adjusts the input current flow 110 from the AC power source. In this manner, an adjustment in value of the brightness command signal changes the electrical power draw of the AC/DC converter 103 from the AC power source.

In some embodiments, the brightness command signal is an analog signal (e.g., a signal communicated via a standard 0-10 Volt interface). In some embodiments, the brightness command signal is a pulse width modulated (PWM) signal.

In one aspect, an LED based illumination system includes an energy storage element and a controlled luminous drawdown module electrically coupled between one or more LEDs and an electrical power converter employed to control current provided to the one or more LEDs during normal operation. The controlled luminous drawdown module senses a reduction in voltage at the output of the electrical power converter and operates to control current flow through one or more LEDs of the LED string until electrical energy stored in the electrical storage element is depleted.

In the embodiment depicted in FIG. 1, controlled luminous drawdown module 130 includes input nodes coupled to nodes 108 and 109 of energy storage element 120, respectively. In addition, controlled luminous drawdown module 130 includes output nodes 131 and 132 coupled across nodes 141 and 142 of LED string 140. As depicted in FIG. 1, LED string 140 includes any suitable number of LEDs coupled in series between nodes 141 and 142. As depicted in FIG. 1, controlled luminous drawdown module 130 regulates a current flow 134 through LED string 140 at a predetermined current value for a period of time after an input signal 110 provided across input nodes 106 and 107 of electrical power converter 105 is shut down, i.e., set to zero.

Figure 2:
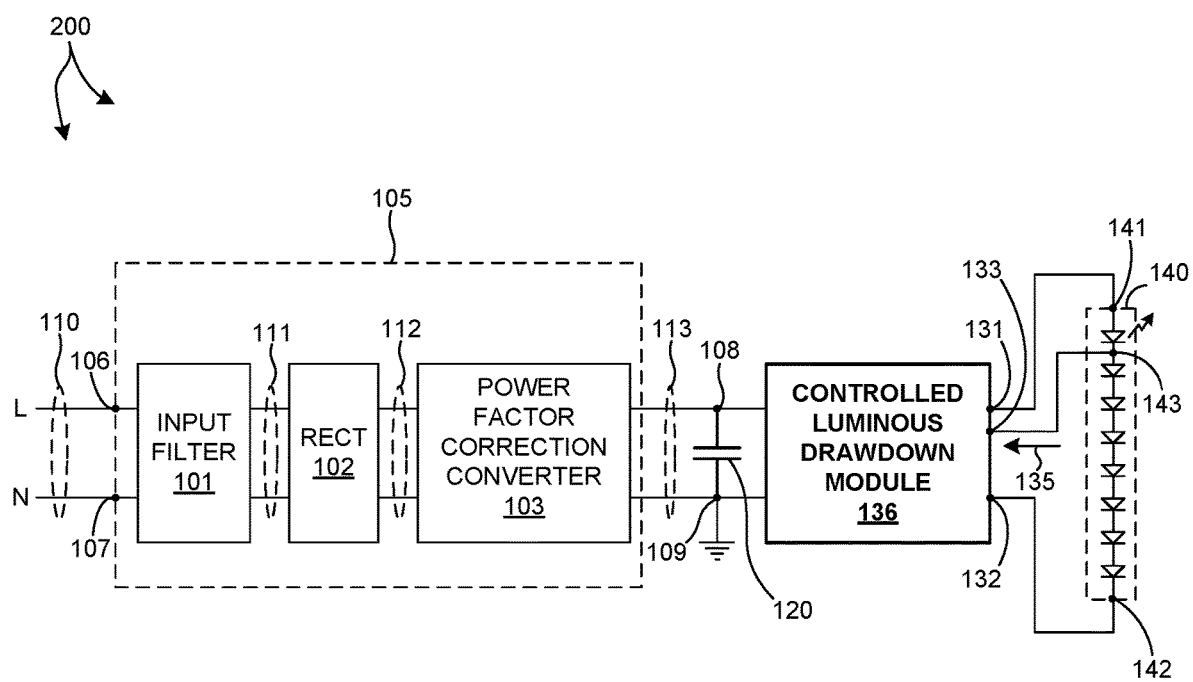
FIG. 2 depicts an illustration of an LED based illumination system 200 in another embodiment.

FIG. 2 depicts an illustration of an LED based illumination system 200 in another embodiment. Like numbered elements depicted in FIG. 2 are analogous to those described with reference to FIG. 1. In the embodiment depicted in FIG. 2, controlled luminous drawdown module 136 includes input nodes coupled to nodes 108 and 109 of energy storage element 120, respectively. In addition, controlled luminous drawdown module 136 includes output nodes 131 and 132 coupled across nodes 141 and 142 of LED string 140. In addition, controlled luminous drawdown module 136 includes a third output node 133 coupled to node 143 of LED string 140. As illustrated in FIG. 2, a subset of the LEDs of LED string 140 are coupled in series between nodes 141 and 143. As depicted in FIG. 2, LED string 140 includes any suitable number of LEDs coupled in series. For example, LED string 140 may include 8 LEDs coupled in series, each having a forward voltage of 6 Volts. In this example, the forward voltage of LED string 140 is 48 Volts. Furthermore, the subset of LEDs between nodes 141 and 143 includes any suitable number of the LEDs. As depicted in FIG. 2, one LED is coupled between nodes 141 and 143. Controlled luminous drawdown module 136 regulates a current flow 135 through the one LED coupled between nodes 141 and 143 at a predetermined current value for a period of time after input signal 110 provided across input nodes 106 and 107 of electrical power converter 105 is shut down, i.e., set to zero.

Figure 3:
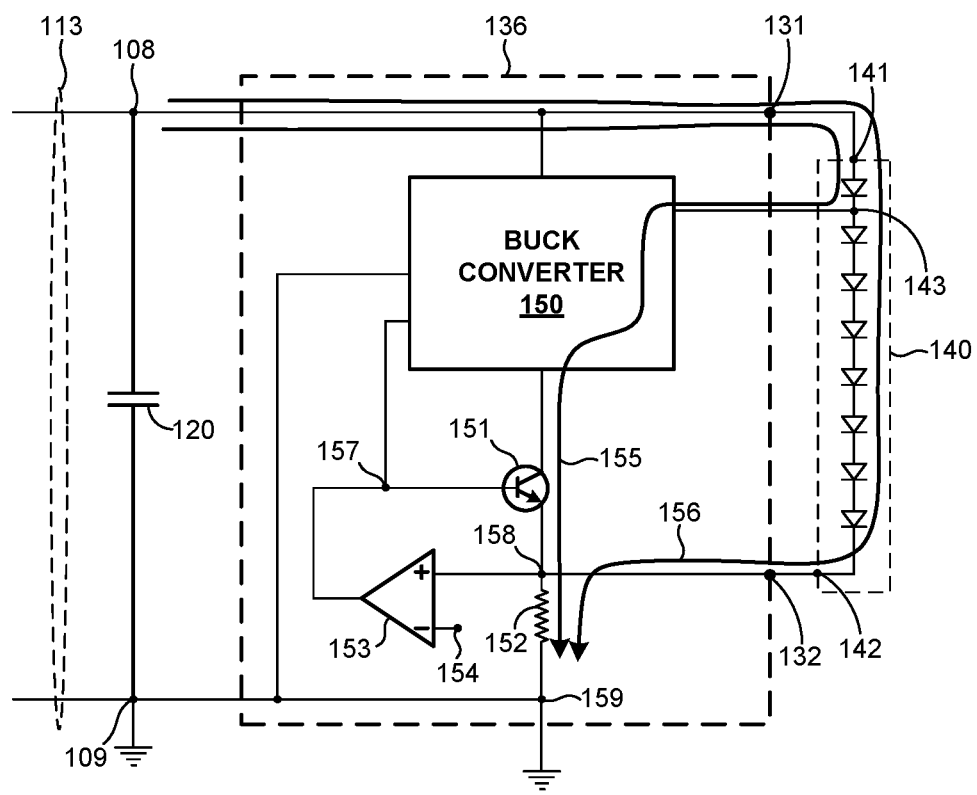
FIG. 3 depicts an illustration of a controlled luminous drawdown module in one embodiment.

FIG. 3 depicts an illustration of a controlled luminous drawdown module in one embodiment. Like numbered elements depicted in FIG. 3 are analogous to those described with reference to FIGS. 1 and 2. As depicted in FIG. 3, controlled luminous drawdown module 136 includes a buck converter 150, a switching element 151, a comparator module 153, and a current sensing resistor 152. Current sensing resistor 152 has a first node 158 coupled to node 142 of LED string 140 and a second node 159 coupled to node 109 of energy storage element 120, which, in the depicted embodiment, is also coupled to electrical ground. In the embodiment depicted in FIG. 3, switching element 151 is a bipolar junction transistor (BJT) having a base coupled to node 157, an emitter coupled to node 158, and a collector coupled to buck converter 150.

Current sensing resistor 152 produces a voltage at node 158 indicative of the current flowing through current sensing resistor 152. Comparator module 153 compares the voltage at node 158 with a reference voltage on node 154 of comparator module 153. In one embodiment, the reference voltage is 0.2 Volts. If the voltage at node 158 is greater than the reference voltage, comparator module 153 pulls down the voltage at node 157 to electrical ground. As a result, no current flows through BJT 151. In this operational mode, buck converter 150 is effectively bypassed and current 156 flows through LED string 140 if the voltage across capacitor 120 is greater than the forward voltage of LED string 140. In one example, a current of 160 milliamps flows through LED string 140 under normal operation. If the voltage across capacitor 120 is less than the forward voltage of LED string 140, no current flows in this operational mode. If the voltage at node 158 is less than the reference voltage, comparator module 153 pulls the voltage at node 157 toward the voltage at node 108. In this operational mode, the base of BJT 151 is released and BJT 151 becomes substantially conductive across the collector and emitter. In this operational mode, buck converter 150 actively controls the current flow 155 through the LED coupled between nodes 141 and 143 to a predetermined current value, e.g., 2 milliamps, until the voltage across capacitor 120 falls below the forward voltage of the LED coupled between nodes 141 and 143, e.g., less than 6 Volts. When this occurs, no further current flows and no light is emitted from LED string 140. In this manner, controlled luminous drawdown module 136 effectively senses when electrical input power to LED driver 105 is shut down by monitoring when the voltage across capacitor 120 falls below a normal operational level, e.g., less than 48 Volts. Furthermore, when this occurs, buck converter 150 regulates the current flow through one LED of a string of LEDs until the voltage across the capacitor falls below the forward voltage of the LED.

In some embodiments, buck converter 150 is a self-oscillating buck converter 150 operating in combination with bipolar junction transistor 151.

Figure 4:
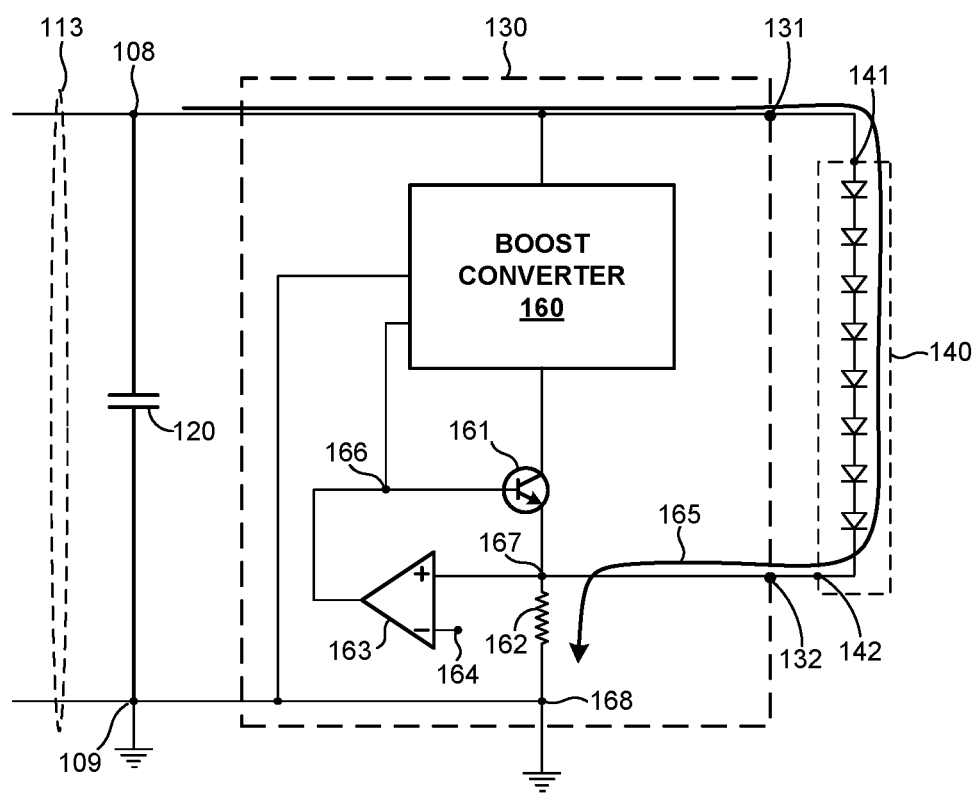
FIG. 4 depicts an illustration of a controlled luminous drawdown module in another embodiment.

FIG. 4 depicts an illustration of a controlled luminous drawdown module in another embodiment. Like numbered elements depicted in FIG. 4 are analogous to those described with reference to FIGS. 1 and 2. As depicted in FIG. 4, controlled luminous drawdown module 130 includes a boost converter 160, a switching element 161, a comparator module 163, and a current sensing resistor 162. Current sensing resistor 162 has a first node 167 coupled to node 142 of LED string 140 and a second node 168 coupled to node 109 of energy storage element 120, which, in the depicted embodiment, is also coupled to electrical ground. In the embodiment depicted in FIG. 4, switching element 161 is a bipolar junction transistor (BJT) having a base coupled to node 166, an emitter coupled to node 167, and a collector coupled to boost converter 160.

Current sensing resistor 162 produces a voltage at node 167 indicative of the current flowing through current sensing resistor 162. Comparator module 163 compares the voltage at node 167 with a reference voltage on node 164 of comparator module 163. In one embodiment, the reference voltage is 0.2 Volts. If the voltage at node 167 is greater than the reference voltage, comparator module 163 pulls down the voltage at node 166 to electrical ground. As a result, no current flows through BJT 161. In this operational mode, boost converter 160 is effectively bypassed and current 165 flows through LED string 140 if the voltage across capacitor 120 is greater than the forward voltage of LED string 140. In one example, a current of 160 milliamps flows through LED string 140 under normal operation. If the voltage at node 167 is less than the reference voltage, comparator module 163 pulls the voltage at node 166 toward the voltage at node 108. In this operational mode, the base of BJT 161 is released and BJT 161 becomes substantially conductive across the collector and emitter. In this operational mode, boost converter 160 actively boosts the voltage at node 131 and effectively controls the current flow 165 through LED string 140 to a predetermined current value, e.g., 2 milliamps, until the electrical energy stored by capacitor 120 is depleted, e.g., completely depleted. When this occurs, no further current flows and no light is emitted from LED string 140. In this manner, controlled luminous drawdown module 136 effectively senses when electrical input power to LED driver 105 is shut down by monitoring when the voltage across capacitor 120 falls below a normal operational level, e.g., less than 48 Volts. Furthermore, when this occurs, boost converter 160 regulates the current flow through the string of LEDs until the voltage across the capacitor is depleted.

In some embodiments, boost converter 160 is a self-oscillating boost converter 160 operating in combination with bipolar junction transistor 161.

Figure 5:
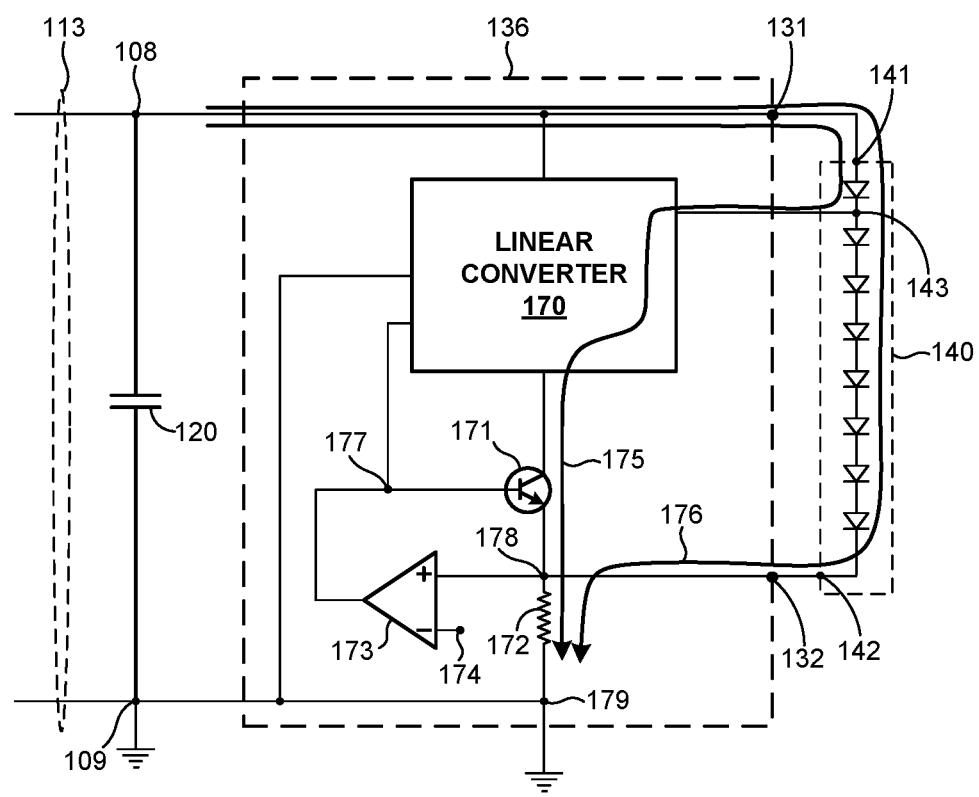
FIG. 5 depicts an illustration of a controlled luminous drawdown module in yet another embodiment.

FIG. 5 depicts an illustration of a controlled luminous drawdown module in yet another embodiment. Like numbered elements depicted in FIG. 5 are analogous to those described with reference to FIGS. 1 and 2. As depicted in FIG. 5, controlled luminous drawdown module 136 includes a linear converter 170, a switching element 171, a comparator module 173, and a current sensing resistor 172. Current sensing resistor 172 has a first node 178 coupled to node 142 of LED string 140 and a second node 179 coupled to node 109 of energy storage element 120, which, in the depicted embodiment, is also coupled to electrical ground. In the embodiment depicted in FIG. 5, switching element 171 is a bipolar junction transistor (BJT) having a base coupled to node 177, an emitter coupled to node 178, and a collector coupled to linear converter 170.

Current sensing resistor 172 produces a voltage at node 178 indicative of the current flowing through current sensing resistor 172. Comparator module 173 compares the voltage at node 178 with a reference voltage on node 174 of comparator module 173. In one embodiment, the reference voltage is 0.2 Volts. If the voltage at node 178 is greater than the reference voltage, comparator module 173 pulls down the voltage at node 177 to electrical ground. As a result, no current flows through BJT 171. In this operational mode, linear converter 170 is effectively bypassed and current 176 flows through LED string 140 if the voltage across capacitor 120 is greater than the forward voltage of LED string 140. In one example, a current of 160 milliamps flows through LED string 140 under normal operation. If the voltage across capacitor 120 is less than the forward voltage of LED string 140, no current flows is this operational mode. If the voltage at node 178 is less than the reference voltage, comparator module 173 pulls the voltage at node 177 toward the voltage at node 108. In this operational mode, the base of BJT 171 is released and BJT 171 becomes substantially conductive across the collector and emitter. In this operational mode, linear converter 170 actively controls the current flow 175 through the LED coupled between nodes 141 and 143 to a predetermined current value, e.g., 2 milliamps, until the voltage across capacitor 120 falls below the forward voltage of the LED coupled between nodes 141 and 143, e.g., less than 6 Volts. When this occurs, no further current flows and no light is emitted from LED string 140. In this manner, controlled luminous drawdown module 136 effectively senses when electrical input power to LED driver 105 is shut down by monitoring when the voltage across capacitor 120 falls below a normal operational level, e.g., less than 48 Volts. Furthermore, when this occurs, linear converter 170 regulates the current flow through one LED of a string of LEDs until the voltage across the capacitor falls below the forward voltage of the LED.

Figure 6:
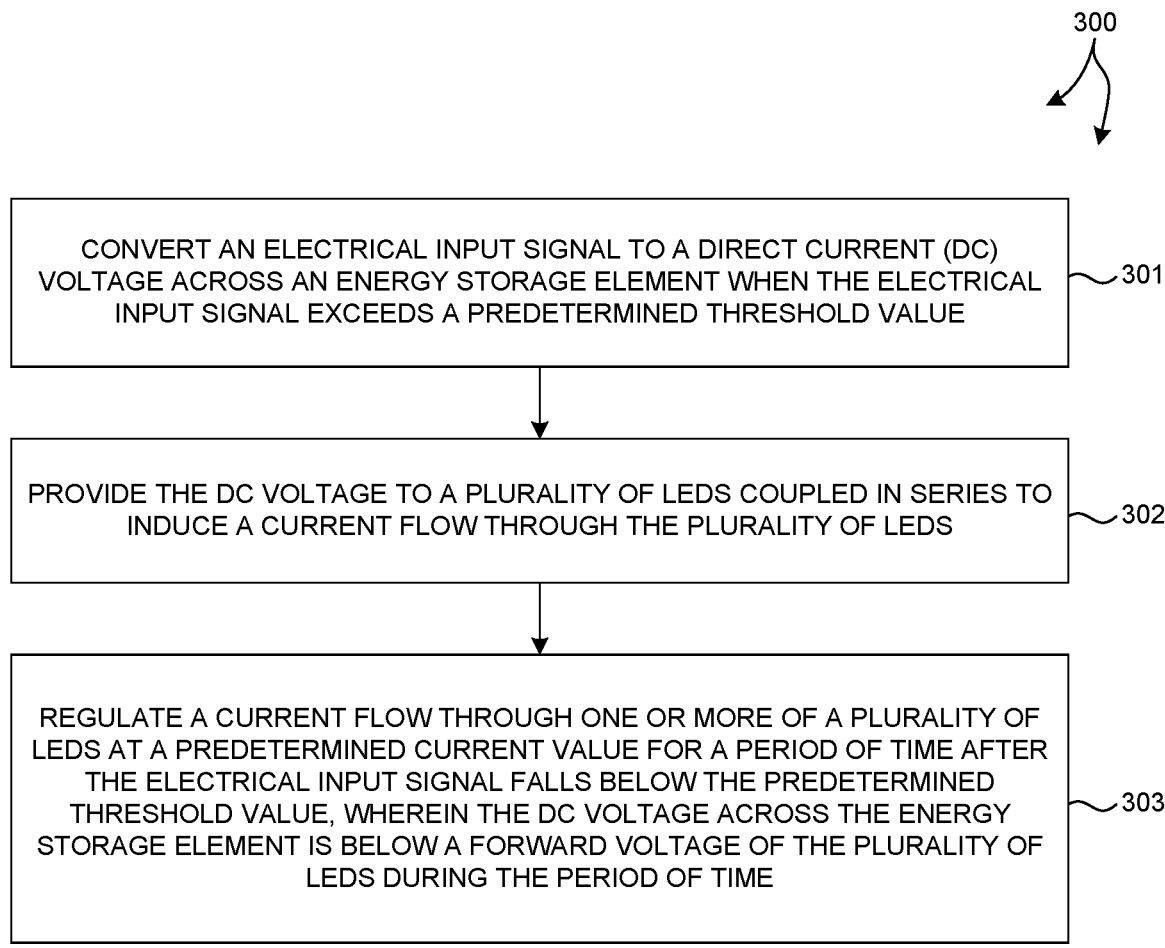
FIG. 6 depicts a flowchart illustrative of a method for controlling current provided to one or more LEDs for a period of time after power supplied to the LED driver is shut down in at least one novel aspect.

FIG. 6 illustrates a method 300 suitable for implementation by any of the described embodiments of the present invention. While the following description is presented in the context of the described embodiments, it is recognized herein that the particular structural aspects of the described embodiments do not represent limitations and should be interpreted as illustrative only.

In block 301, an electrical input signal is converted to a Direct Current (DC) voltage across an energy storage element when the electrical input signal exceeds a predetermined threshold value.

In block 302, the DC voltage is provided to a plurality of LEDs coupled in series to induce a current flow through the plurality of LEDs.

In block 303, a current flow through one or more of a plurality of LEDs is regulated at a predetermined current value for a period of time after the electrical input signal falls below the predetermined threshold value. The DC voltage across the energy storage element is below a forward voltage of the plurality of LEDs during the period of time.

In some embodiments, the controlled luminous drawdown module is integrated with LED driver 105 and LED string 140 as a fully integrated LED based illumination device. In these embodiments, it is preferable to employ a buck converter based controlled luminous drawdown module to maximize electrical efficiency.

In some embodiments, the controlled luminous drawdown module is integrated with LED driver 105, but not with LED string 140. In these embodiments, it may be preferable to employ a boost converter based controlled luminous drawdown module to provide a simple electrical interface with the LED string. As illustrated in FIGS. 1-5, a controlled luminous drawdown module 130 employing a boost converter is coupled across the same LEDs during normal operation and during controlled drawdown. However, a controlled luminous drawdown module 136 employing a buck or linear converter is coupled different LEDs during normal operation and during controlled drawdown. For practical reasons, it may be difficult to interface a controlled luminous drawdown module having three output nodes with LED strings available on the market, which typically do not provide access to different subsets of LEDs.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A Light Emitting Diode (LED) electrical power driver, comprising:
   an electrical power converter including a first input node and a second input node;
   an energy storage element having a first node coupled to a first output node of the electrical power converter and a second node coupled to a second output node of the electrical power converter; and
   a controlled luminous drawdown module having a first input node coupled to the first node of the energy storage element, a second input node coupled to the second node of the energy storage element, a first output node configured to be coupled to a first node of an LED string including a plurality of LEDs coupled in series, and a second output node configured to be coupled to a second node of the LED string, wherein the plurality of LEDs are coupled in series between the first node and the second node of the LED string, and wherein the controlled luminous drawdown module regulates a current flow through one or more of the plurality of LEDs of the LED string at a predetermined current value for a period of time after an input signal provided across the first and second input nodes of the electrical power converter is set to zero.

2. The LED electrical power driver of claim 1, wherein the electrical power converter is an Alternating Current/Direct Current (AC/DC) power converter or a Direct Current/Direct Current (DC/DC) power converter.

3. The LED electrical power driver of claim 1, wherein the energy storage element is a capacitor having a capacitance greater than 100 microfarads.

4. The LED electrical power driver of claim 1, wherein the energy storage element is any of a rechargeable battery, an electrolytic capacitor, and a supercapacitor.

5. The LED electrical power driver of claim 1, the controlled luminous drawdown module comprising:
   a current sensing resistor having a first node coupled to the second node of the LED string and the second node of the electrical switching element, and a second node coupled to the second node of the energy storage element, the controlled luminous drawdown module configured to operate in a first mode when a current flow through the current sensing resistor is less than a predetermined threshold value and a second mode when the current flow through the current sensing resistor is greater than the predetermined threshold value.

6. The LED electrical power driver of claim 5, the controlled luminous drawdown module having a third output node coupled to a third node of the LED string, wherein the one or more of the plurality of LEDs are coupled in series between the first node and the third node.

7. The LED electrical power driver of claim 6, the controlled luminous drawdown module comprising a buck converter coupled to the third node of the LED string and the first node of the current sensing resistor, wherein a current flows through the one or more of the plurality of LEDs, the buck converter, and the current sense resistor in the first mode.

8. The LED electrical power driver of claim 7, wherein the buck converter is a self-oscillating buck converter.

9. The LED electrical power driver of claim 7, the controlled luminous drawdown module comprising a linear converter coupled to the third node of the LED string and the first node of the current sensing resistor, wherein a current flows through the one or more of the plurality of LEDs, the linear converter, and the current sense resistor in the first mode.

10. The LED electrical driver of claim 6, the controlled luminous drawdown module comprising a self-oscillating boost converter coupled to the first node of the LED string and selectively coupled to the first node of the current sensing resistor, wherein the self-oscillating boost converter is coupled to the first node of the current sensing resistor in the first mode, and wherein the self-oscillating boost converter increases a voltage at the first node of the LED string in the first mode.

11. An Alternating Current/Direct Current (AC/DC) electrical power converter, comprising:
- a rectifier having a first input node and a second input node and a first output node and a second output node, wherein an Alternating Current (AC) input signal is provided across the first and second input nodes, and wherein a rectified voltage signal is provided by the rectifier across the first and second output nodes;
- a Power Factor Correction Converter (PFCC) having a first input node and a second input node, wherein the first input node of the PFCC is coupled to the first output node of the rectifier and the second input node of the PFCC is coupled to the second output node of the rectifier;
- an energy storage element having a first node coupled to the first output node of the PFCC and a second node coupled to the second output node of the PFCC; and
- a controlled luminous drawdown module having a first input node coupled to the first node of the energy storage element, a second input node coupled to the second node of the energy storage element, a first output node coupled to a first node of an LED string including a plurality of LEDs coupled in series, and a second output node coupled to a second node of the LED string, wherein the plurality of LEDs are coupled in series between the first node and the second node of the LED string, and wherein the controlled luminous drawdown module regulates a current flow through one or more of the plurality of LEDs of the LED string at a predetermined current value for a period of time after the AC input signal is set to zero.

12. The Alternating Current/Direct Current (AC/DC) electrical power converter of claim 11, wherein the energy storage element is a capacitor having a capacitance greater than 100 microfarads.

13. The Alternating Current/Direct Current (AC/DC) electrical power converter of claim 11, wherein the energy storage element is any of a rechargeable battery, an electrolytic capacitor, and a supercapacitor.

14. The Alternating Current/Direct Current (AC/DC) electrical power converter of claim 11, the controlled luminous drawdown module having a third output node coupled to a third node of the LED string, wherein the one or more of the plurality of LEDs are coupled in series between the first node and the third node.

15. The Alternating Current/Direct Current (AC/DC) electrical power converter of claim 14, the controlled luminous drawdown module comprising:
- an electrical switching element having a control node, a first node, and a second node, wherein the electrical switching element is substantially conductive between the first and second nodes in a first voltage state on the control node and is substantially non-conductive between the first and second nodes in a second voltage state on the control node;
- a current sensing resistor having a first node coupled to the second node of the LED string and the second node of the electrical switching element, and a second node coupled to the second node of the energy storage element; and
- a comparing circuit having a reference voltage provided on a first input node, a second input node coupled to the first node of the current sensing resistor, and an output node coupled to the control node of the electrical switching element, wherein the comparing circuit determines a difference between a voltage at the first node of the current sensing resistor and the reference voltage and drives the electrical switching element to the substantially conductive state when the voltage at the first node of the current sensing resistor exceeds the reference voltage and drives the electrical switching element to the substantially non-conductive state when the voltage at the first node of the current sensing resistor is less than the reference voltage.

16. The Alternating Current/Direct Current (AC/DC) electrical power converter of claim 15, wherein the electrical switching element is a bipolar junction transistor.

17. The Alternating Current/Direct Current (AC/DC) electrical power converter of claim 15, further comprising:
- a buck converter having first node coupled to the first node of the energy storage element, a second node coupled to the second node of the energy storage element, a third node coupled to the third node of the LED string, a fourth node coupled to the control node of the electrical switching element, and a fifth node coupled to the first node of the electrical switching element, wherein a current flows from the third node of the LED string through the buck converter to the first node of the current sensing resistor when the electrical switching element is substantially conductive.

18. The Alternating Current/Direct Current (AC/DC) electrical power converter of claim 15, further comprising:
- a linear converter having first node coupled to the first node of the energy storage element, a second node coupled to the second node of the energy storage element, a third node coupled to the third node of the LED string, a fourth node coupled to the control node of the electrical switching element, and a fifth node coupled to the first node of the electrical switching element, wherein a current flows from the third node of the LED string through the linear converter to the first node of the current sensing resistor when the electrical switching element is substantially conductive.

19. The Alternating Current/Direct Current (AC/DC) electrical power converter of claim 15, further comprising:
- a boost converter having first node coupled to the first node of the energy storage element, a second node coupled to the second node of the energy storage element, a third node coupled to the control node of the electrical switching element, and a fourth node coupled to the first node of the electrical switching element, wherein the boost converter increases a voltage at the first node of the LED string when the electrical switching element is substantially conductive.

20. A method comprising:
- converting an electrical input signal to a Direct Current (DC) voltage across an energy storage element when the electrical input signal exceeds a predetermined threshold value;
- providing the DC voltage to a plurality of LEDs coupled in series to induce a current flow through the plurality of LEDs; and
- regulating a current flow through one or more of a plurality of LEDs at a predetermined current value for a period of time after the electrical input signal falls below the predetermined threshold value, wherein the DC voltage across the energy storage element is below a forward voltage of the plurality of LEDs during the period of time.

21. The method of claim 20, wherein the energy storage element is a capacitor having a capacitance greater than 100 microfarads.

22. The method of claim 20, wherein the energy storage element is any of a rechargeable battery, an electrolytic capacitor, and a supercapacitor.

23. The method of claim 20, wherein the regulating of the current flow involves:
   monitoring a current flow through one or more of the plurality of LEDs; and
   switching a buck converter into a current path between the energy storage element and the one or more of the plurality of LEDs when the current flow is below a predetermined threshold value, and switching the buck converter out of the current path between the energy storage element and the one or more of the plurality of LEDs when the current flow is above the predetermined threshold value.

24. The method of claim 20, wherein the regulating of the current flow involves:
   monitoring a current flow through one or more of the plurality of LEDs; and
   switching a linear converter into a current path between the energy storage element and the one or more of the plurality of LEDs when the current flow is below a predetermined threshold value, and switching the linear converter out of the current path between the energy storage element and the one or more of the plurality of LEDs when the current flow is above the predetermined threshold value.

25. The method of claim 20, wherein the regulating of the current flow involves:
   monitoring a current flow through one or more of the plurality of LEDs; and
   coupling a boost converter across the plurality of LEDs when the current flow is below a predetermined threshold value, and decoupling the boost converter from the plurality of LEDs when the current flow is above the predetermined threshold value.

* * * * *